US012781642B2

(12) United States Patent
Jarrossay et al.

(10) Patent No.: US 12,781,642 B2
(45) Date of Patent: Nov. 3, 2026

(54) TURBINE RING ASSEMBLY WITH IMPROVED AXIAL PINS

(71) Applicant: SAFRAN AIRCRAFT ENGINES, Paris (FR)

(72) Inventors: Clément Jarrossay, Moissy-Cramayel (FR); Sébastien Serge Francis Congratel, Moissy-Cramayel (FR); Erwan Daniel Botrel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/164,486

(22) PCT Filed: Mar. 11, 2024

(86) PCT No.: PCT/FR2024/050291

§ 371 (c)(1),
(2) Date: Sep. 11, 2025

(87) PCT Pub. No.: WO2024/189287

PCT Pub. Date: Sep. 19, 2024

(65) Prior Publication Data

US 2026/0243174 A1 Aug. 20, 2026

(30) Foreign Application Priority Data

Mar. 13, 2023 (FR) ........................................ 2302291

(51) Int. Cl.

*F01D 25/24* (2006.01)
*F01D 11/00* (2006.01)
*F01D 11/08* (2006.01)

(52) U.S. Cl.

CPC .......... *F01D 25/246* (2013.01); *F01D 11/008* (2013.01); *F01D 11/08* (2013.01);
(Continued)

(58) Field of Classification Search

CPC ...... F01D 25/246; F01D 11/008; F01D 11/08; F01D 25/24; F05D 2240/11;
(Continued)

(56) References Cited

U.S. PATENT DOCUMENTS 6,364,606 B1 * 4/2002 Rice ....................... F01D 25/246 415/214.1
11,047,245 B2 * 6/2021 McCaffrey ............ F01D 25/246
(Continued)

FOREIGN PATENT DOCUMENTS

EP 1350927 A2 10/2003
EP 3511532 A1 * 7/2019 .............. F16C 35/06
(Continued)

OTHER PUBLICATIONS

Search Report and Written Opinion issued in International Application No. PCT/FR2024/050291, issued Jun. 24, 2024.

*Primary Examiner* — Brian Christopher Delrue
(74) *Attorney, Agent, or Firm* — Bookoff McAndrews, PLLC

(57) ABSTRACT

A turbine ring assembly provided with a CMC-sectored turbine ring and a ring support structure, each sector of the ring containing a base from which an upstream hooking lug and a downstream hooking lug axially spaced from each other extend radially outwards, the support structure including an upstream radial clamp and a downstream radial clamp between which the hooking lugs of each sector are held, and the assembly including, for each sector, at least one pin and at least one passage passing axially through a hooking lug over an axial length of the passage. At least one pin containing a planar bearing surface facing an inner surface of the passage through which the pin passes, the bearing surface facing the inner surface extending axially over a length smaller than the axial length of the passage.

11 Claims, 4 Drawing Sheets

(52) U.S. Cl.
CPC .......... *F01D 25/24* (2013.01); *F05D 2230/64* (2013.01); *F05D 2230/642* (2013.01); *F05D 2240/11* (2013.01); *F05D 2300/6033* (2013.01)

(58) Field of Classification Search
CPC ....... F05D 2230/642; F05D 2300/6033; F05D 2230/64
See application file for complete search history.

(56) References Cited

U.S. PATENT DOCUMENTS

| | | | | |
|---|---|---|---|---|
| 11,255,210 | B1 * | 2/2022 | Freeman | F01D 11/16 |
| 11,319,828 | B1 * | 5/2022 | Freeman | F01D 25/246 |
| 11,773,751 | B1 * | 10/2023 | Freeman | F01D 11/08 415/173.1 |
| 2004/0062640 | A1 * | 4/2004 | Darkins, Jr. | F01D 11/08 415/173.1 |
| 2005/0158168 | A1 * | 7/2005 | Bruce | F01D 25/08 415/173.1 |
| 2012/0082540 | A1 | 4/2012 | Dziech et al. | |
| 2014/0271145 | A1 * | 9/2014 | Thomas | F01D 11/08 415/173.1 |
| 2016/0186611 | A1 * | 6/2016 | Vetters | F01D 25/246 415/173.2 |
| 2016/0319688 | A1 * | 11/2016 | Vetters | F01D 25/246 |
| 2017/0204744 | A1 * | 7/2017 | Varney | F01D 25/246 |
| 2018/0051591 | A1 * | 2/2018 | Quennehen | F01D 25/28 |
| 2018/0087401 | A1 * | 3/2018 | Quennehen | F01D 25/12 |
| 2018/0363504 | A1 * | 12/2018 | Taxacher | F01D 9/04 |
| 2019/0112947 | A1 * | 4/2019 | Walston | F01D 25/246 |
| 2021/0047936 | A1 * | 2/2021 | McCaffrey | F23R 3/002 |
| 2021/0164365 | A1 * | 6/2021 | Starr | F01D 11/08 |
| 2021/0164366 | A1 * | 6/2021 | Jarrossay | F01D 11/08 |
| 2021/0172339 | A1 * | 6/2021 | Freeman | F01D 25/246 |
| 2021/0285334 | A1 * | 9/2021 | Arbona | F01D 11/08 |
| 2021/0332714 | A1 * | 10/2021 | Starr | F01D 25/005 |

FOREIGN PATENT DOCUMENTS

| | | | | | |
|---|---|---|---|---|---|
| EP | 3779131 | A1 * | 2/2021 | | F01D 25/246 |
| EP | 3988764 | A1 * | 4/2022 | | F01D 25/246 |
| FR | 2540939 | A1 | 8/1984 | | |
| FR | 2955898 | A1 | 8/2011 | | |
| FR | 3036433 | A1 * | 11/2016 | | F01D 11/08 |
| FR | 3065024 | A1 | 10/2018 | | |
| FR | 3086327 | A1 | 3/2020 | | |
| GB | 2480766 | A | 11/2011 | | |
| WO | WO-2020128338 | A2 * | 6/2020 | | F01D 25/246 |
| WO | WO-2025088261 | A1 * | 5/2025 | | F01D 11/08 |

* cited by examiner

[Fig. 1]
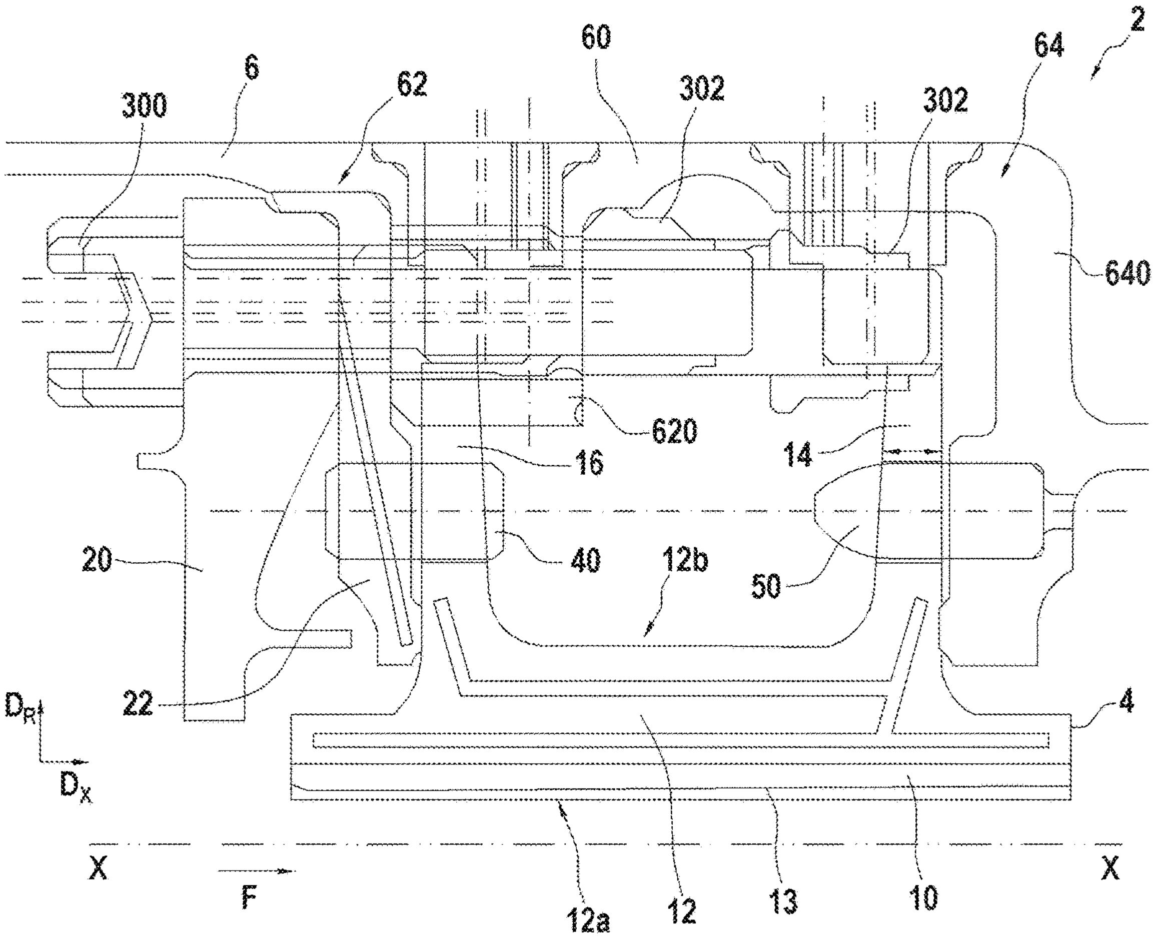
[Fig. 2]
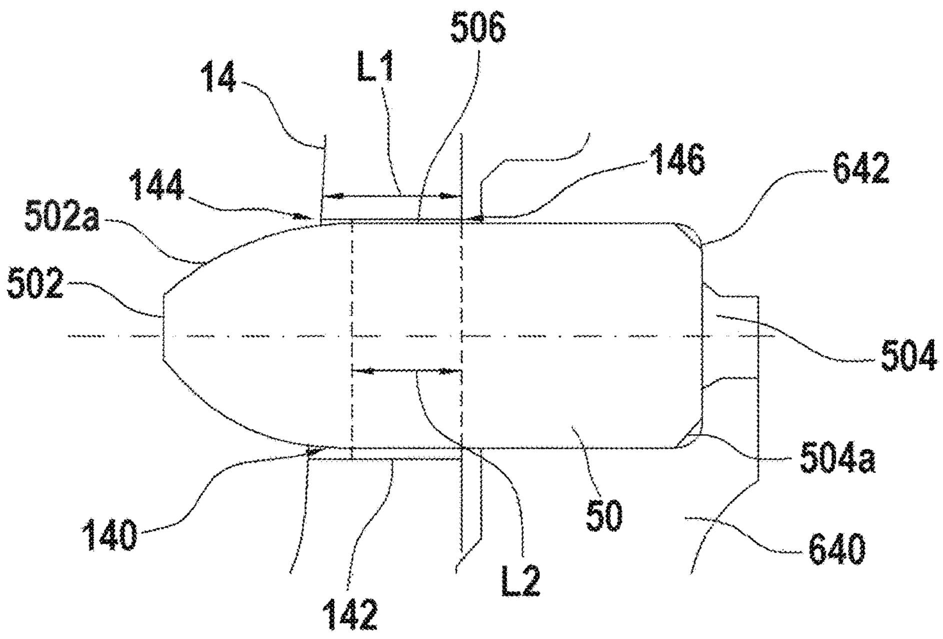

[Fig. 3]
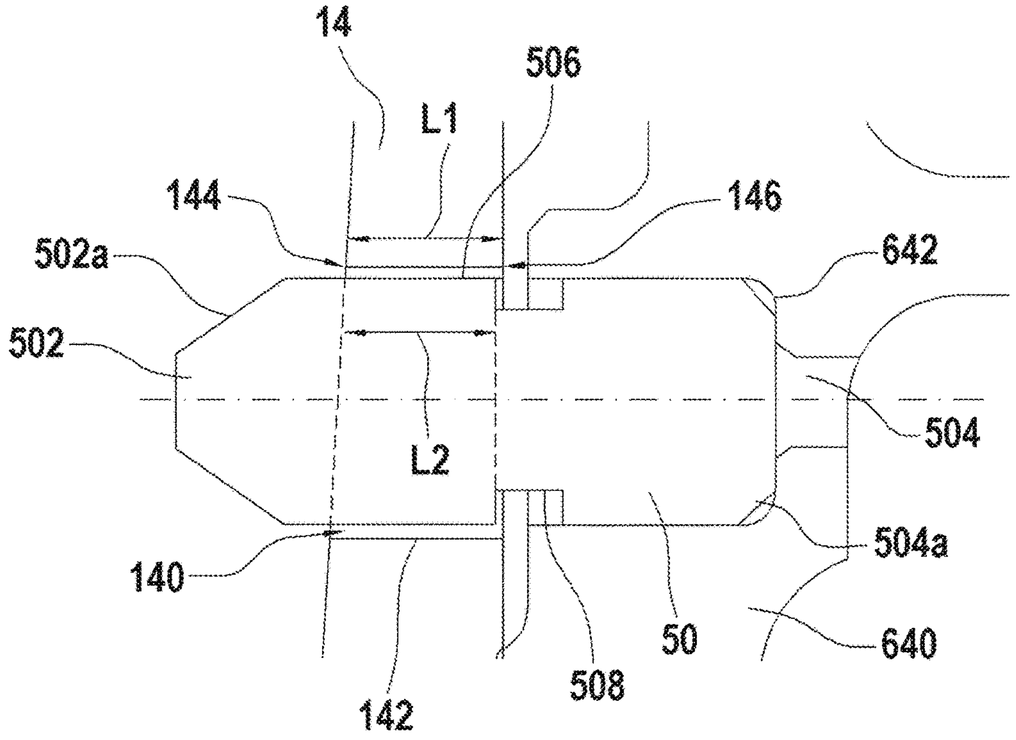
[Fig. 4]
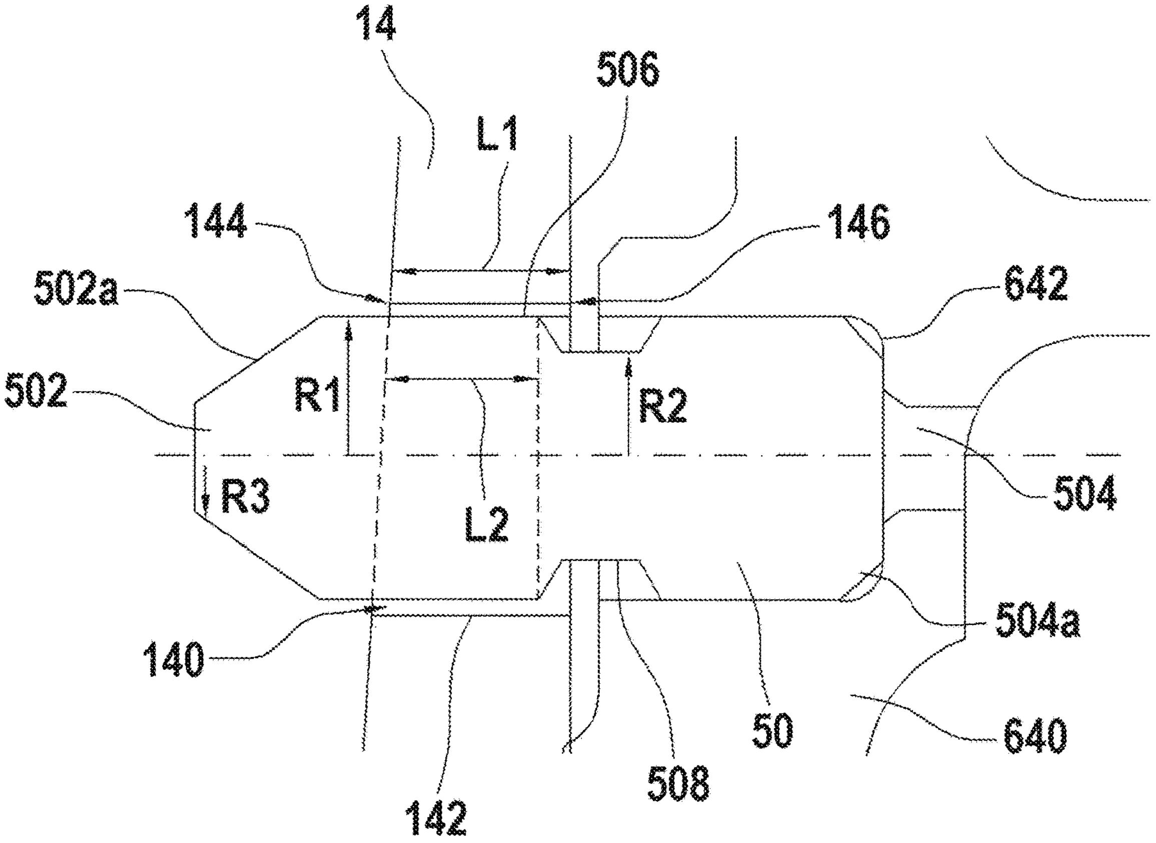

[Fig. 5]
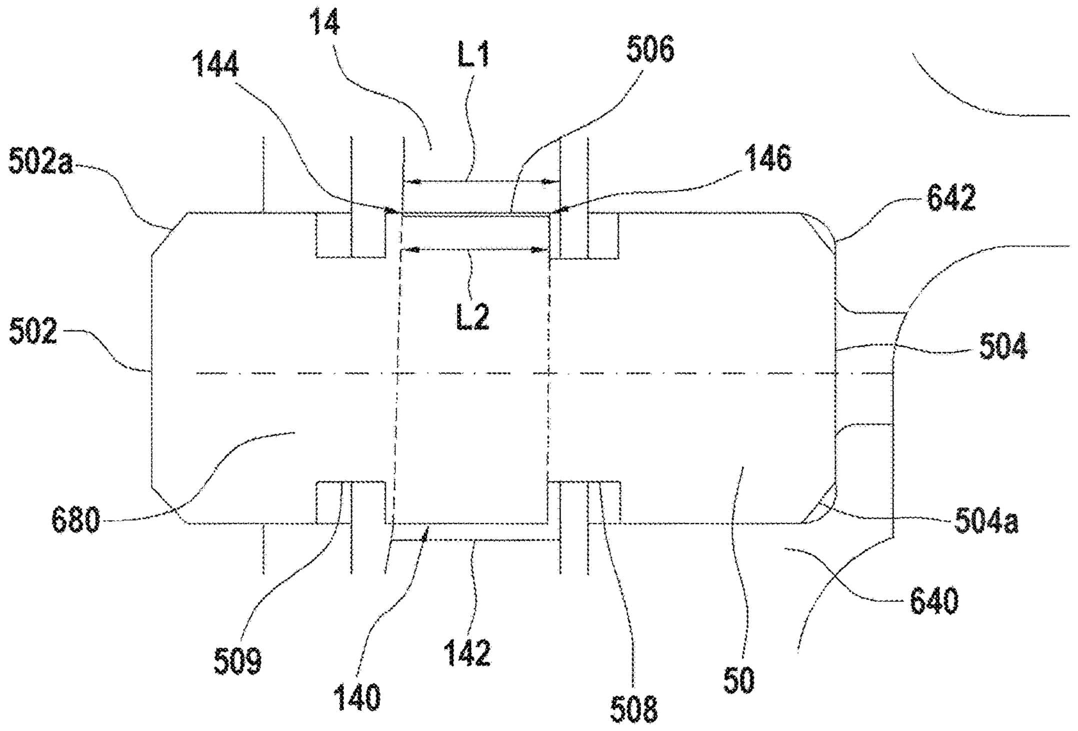
[Fig. 6]
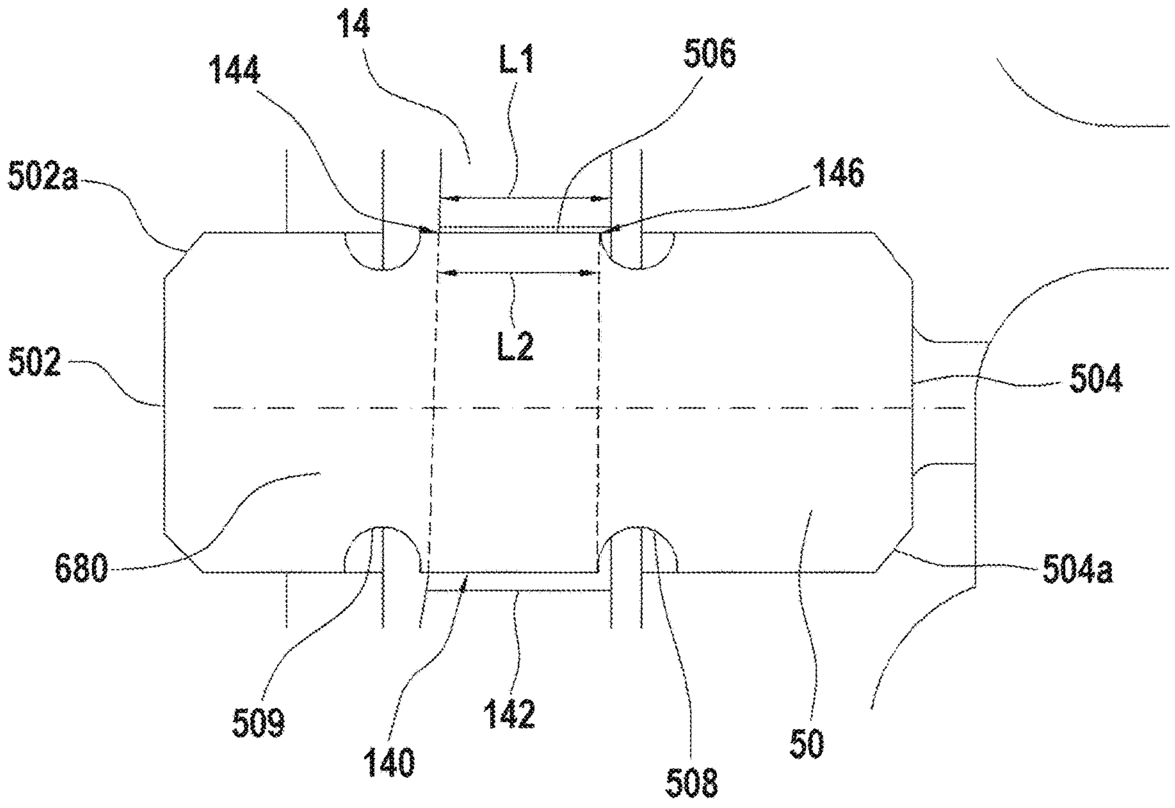

[Fig. 7]
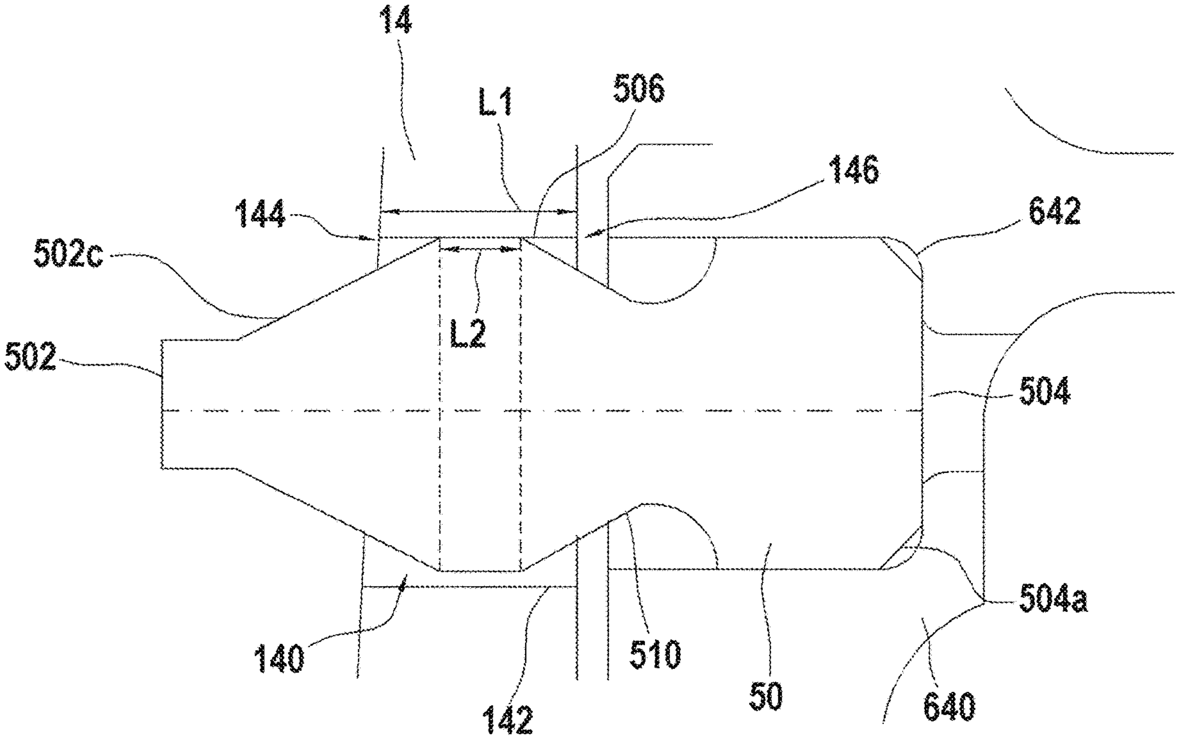

TURBINE RING ASSEMBLY WITH IMPROVED AXIAL PINS

CROSS-REFERENCE TO RELATED APPLICATIONS

This is a National Stage Application under 35 U.S.C. § 371 of International Application No. PCT/FR2024/050291, filed Mar. 11, 2024, now published as WO 2024189287A1, which claims priority to French Patent Application No. 2302291, filed on Mar. 13, 2023, the entireties of which are incorporated herein by reference.

TECHNICAL FIELD

The invention relates to a turbine ring assembly for a turbomachine, in which the assembly comprises a plurality of angular ring sectors made of ceramic matrix composite material placed end to end to form a turbine ring.

The field of application of the invention is in particular that of gas turbine aeronautical engines. However, the invention is applicable to other turbomachines, for example industrial turbines.

PRIOR ART

In the case of all-metal turbine ring assemblies, it is necessary to cool all the elements of the assembly and particularly the turbine ring which is subject to the hottest streams. This cooling has a significant impact on the engine performance since the cooling stream used is taken from the main stream of the engine. Furthermore, the use of metal for the turbine ring limits the possibilities of increasing the temperature at the turbine, which would allow improving the performance of the aeronautical engines.

In an attempt to solve these problems, it has been envisaged to make turbine ring sectors made of ceramic matrix composite (CMC) material in order to eliminate the need for the implementation of a metal material.

CMC materials have good mechanical properties enabling them to constitute structural elements and advantageously retain these properties at high temperatures. The implementation of CMC materials advantageously allowed reducing the cooling stream required during operation and thus increasing the performance of the turbomachines. Furthermore, the implementation of CMC materials advantageously allows reducing the mass of turbomachines and reducing the hot expansion effect encountered with the metal parts.

Furthermore, documents FR 2 540 939, GB 2 480 766, EP 1 350 927, US 2014/0271145, US 2012/082540 and FR 2 955 898 which disclose turbine ring assemblies are known.

The ring sectors include an annular base whose inner face defines the inner face of the turbine ring and an outer face from which two lugs whose ends are held between the two clamps of a metal ring support structure extend radially.

The integration of a CMC ring comprises radial holding of the part, partly ensured by one or more axial pins. In the known document FR 3 086 327, there are four pins, two upstream pins and two downstream pins.

The use of CMC ring sectors thus allows significantly reducing the ventilation necessary to cool the turbine ring, and therefore increasing efficiency. They also allow for a mass saving because they are lighter than the commonly used metal alloys.

However, since the CMC has a different mechanical behavior from that of a metal material, its integration and the way of positioning it within the turbine had to be rethought.

Indeed, the CMC does not withstand shrink-fit mountings (usually used for the metal rings) and its thermal expansion is lower than that of a metal material.

The radial bearing area between the pins and the top of the ring wings through which the pins pass is one of the sensitive areas of the technology, with high mechanical stresses. Significant partial damage was observed on a test bench. This phenomenon could be amplified during engine operation due to an inevitable tilting of the part. The most marked wear areas being close to the edges of the ring holes, such a tilting would lead to even more significant effects.

DISCLOSURE OF THE INVENTION

The main purpose of the present invention is therefore to propose a turbine ring assembly that does not have the aforementioned drawbacks while having a reduced mass and further reducing the intensity of the mechanical stresses to which the CMC ring sectors are subjected during the operation of the turbine.

More particularly, the solution of the present invention aims to reduce the risk of wear on the wings receiving the pins, in particular at the edges of the bores of the wings.

This aim is achieved by means of a turbine ring assembly comprising a plurality of ring sectors made of ceramic matrix composite material forming a turbine ring, defining an axial direction and a radial direction, and a ring support structure held by a turbine casing, each ring sector comprising a base from which an upstream hooking lug and a downstream hooking lug axially spaced from each other extend radially outwards, the ring support structure including an upstream radial clamp and a downstream radial clamp between which the upstream hooking lug and the downstream hooking lug of each ring sector are held, and the ring assembly comprising, for each ring sector, at least one pin and at least one passage passing axially through a downstream or upstream hooking lug over an axial length of the passage, said at least one pin cooperating with said at least one passage and one of the upstream or downstream radial clamps of the ring support structure.

The turbine ring assembly according to the invention is notable in particular in that the passage extends axially between an upstream end and a downstream end and is delimited by an inner surface extending over the axial length of the passage and, along a cutting plane including the axial direction, said at least one pin comprises an outer or peripheral surface which has a planar bearing portion facing the inner surface of said passage through which the pin passes, said bearing portion of the peripheral surface of the pin facing the inner surface of the passage through which the pin extending axially over a length smaller than said axial length of the passage passes.

The solution of the present invention thus allows reducing the risk of wear of the passages through which a pin passes thanks to a specific geometry of the axial pins used. The geometry of the pin according to the invention thus allows ensuring that the bearing between the pin and the passage made in the CMC ring does not occur on at least one edge of the passage but rather in the middle of the material of the CMC ring. In other words, the invention allows ensuring that the pin is not bearing with the ridge of the hole forming the passage in the lug of the ring, but as much as possible with the middle of the hole along the axial direction.

The bearing portion of the peripheral surface of the pin preferably comprises an axial length comprised between 50% and 90% of the axial length of the passage.

Preferably, the inner surface of the passage is planar.

Also preferably, the peripheral surface of the pin is bearing against the inner surface.

According to a first aspect of the turbine ring assembly, said at least one pin may comprise two opposite axial ends, the pin comprising a chamfer on at least one axial end of the pin.

Preferably, the chamfer is frustoconical.

The chamfer made at one or both axial ends facilitates the insertion of the pin into the corresponding passages or orifices.

According to a second aspect of the turbine ring assembly, a chamfer may extend between an axial end of the pin and said bearing portion of the peripheral surface of the pin, a portion of the chamfer being disposed facing the inner surface of the passage through which the pin passes.

The use of a chamfer extending from the axial end of the pin to the bearing surface of the pin simplifies the manufacture of the pin while combining an effect of simplifying the insertion of the pin into a passage and the prevention of damage to the edges of the passage.

According to a third aspect of the turbine ring assembly, said at least one pin may comprise at least one groove extending over the perimeter of the peripheral surface of the pin in a plane orthogonal to the axial direction, the groove(s) comprising a thickness along the axial direction and being positioned facing one end of said passage through which the pin passes.

The groove provided facing the edge of a passage allows for easy manufacture of axial pins, significantly reducing the risk of damage to the passage edges.

Preferably, the pin comprises axial symmetry along an axis parallel to the axial direction, a first radius in a cutting plane perpendicular to the axial direction and intersecting the bearing surface of the pin, a second radius in a cutting plane perpendicular to the axial direction and intersecting the groove, and a third radius in a cutting plane perpendicular to the axial direction and intersecting the axial end of the pin located facing the ring, the first radius being larger than the second radius, which is itself larger than the third radius.

According to a fourth aspect of the turbine ring assembly, the groove may comprise a semicircular shape in a cutting plane comprising the axial direction and the radial direction.

In one variant, the groove may comprise a trapezoidal shape in a cutting plane comprising the axial direction and the radial direction.

In another embodiment, the pin may comprise axial symmetry along an axis parallel to the axial direction, a first radius in a cutting plane perpendicular to the axial direction and intersecting the bearing portion of the peripheral surface of the pin, a second radius in a cutting plane perpendicular to the axial direction and intersecting the groove, and a third radius in a cutting plane perpendicular to the axial direction and intersecting the axial end of the pin disposed facing the ring, the first radius being greater than the second radius, which is itself greater than the third radius.

According to a fifth aspect of the turbine ring assembly, the ring assembly may comprise, for each ring sector, at least one downstream pin cooperating with the downstream hooking lug and the downstream radial clamp of the support structure, and at least one upstream pin cooperating with the upstream hooking lug and the upstream radial clamp.

In one variant, the turbine ring assembly may comprise, for each ring sector, at least two pins, each pin passing transversely through the upstream hooking lug and the downstream hooking lug of the ring sector and the ring support to keep the ring sector and the ring support secured to each other.

The invention also relates to a turbomachine comprising an assembly as defined above.

BRIEF DESCRIPTION OF THE DRAWINGS

FIG. 1 is a schematic sectional view along a plane comprising the axial direction and the radial direction of a turbine ring assembly according to the invention.

FIG. 2 is a zoom of FIG. 1 on the downstream pin 50.

FIG. 3 represents a schematic view of a pin according to a second embodiment of the invention.

FIG. 4 represents a schematic view of a pin according to a third embodiment of the invention.

FIG. 5 represents a schematic view of a pin according to a fourth embodiment of the invention.

FIG. 6 represents a schematic view of a pin according to a fifth embodiment of the invention.

FIG. 7 represents a schematic view of a pin according to a sixth embodiment of the invention.

DESCRIPTION OF THE EMBODIMENTS

FIG. 1 schematically represents a turbine ring assembly 2 according to the invention. FIG. 1 is a sectional view along a plane comprising the radial direction $D_R$ and the axial direction $D_A$.

This assembly 2 in particular comprises a turbine ring 4 made of ceramic matrix composite (CMC) material centered on a longitudinal axis X-X, a metal ring support structure 6 fixed to a turbine casing (not represented for more visibility). The turbine ring 4 surrounds a set of turbine blades (not represented).

Hereinafter, throughout the text, the terms “upstream” and “downstream” are used with reference to the direction of flow of the gas stream F through the blades, indicated by an arrow.

Moreover, the turbine ring 4 is formed of a plurality of angular ring sectors 10 that are placed end to end along the circumferential direction to form a ring. In FIG. 1, the arrow $D_A$ indicates the axial direction of the turbine ring while the arrow $D_R$ indicates the radial direction of the turbine ring.

Each angular ring sector 10 has a section substantially in the shape of an inverted Pi (or π) with a base 12 provided with an inner face 12_a_ which defines an angular portion of the inner face of the turbine ring 4 and which is typically provided with an abradable coating layer 13 also acting as a thermal and environmental barrier.

Two hooking lugs, a downstream hooking lug 14 and an upstream hooking lug 16, extend radially from the outer face 12_b_ of the base 12 opposite to the inner face 12_a_. These hooking lugs 14 and 16 extend over the entire width of each ring sector 10 (in the circumferential direction).

The ring support structure 6 comprises a shroud 60 extending about the axis X-X, as well as an upstream radial clamp 62 and a downstream radial clamp 64 extending radially inward from the shroud 60. The downstream radial clamp 64 comprises an attachment portion 640 protruding radially from the shroud 60, and the upstream radial clamp 62 comprises an attachment portion 620 protruding radially from the shroud 60, as well as a first upstream flange 20 and a second upstream flange 22 fixed to the attachment portion 620 protruding radially from the upstream radial clamp 62 using bolts 300 and nuts 302. The first upstream flange 20 is disposed upstream of the second upstream flange 22. The bolts 300 axially pass through the first upstream flange 20, the second upstream flange 22 and the attachment portion 520 of the upstream radial clamp 62.

The upstream radial clamp 62 and the downstream radial clamp 64 thus form two hooking clamp of the ring 4, disposed axially between the downstream hooking lug 14 and the upstream hooking lug 16 of the ring sectors 10.

The turbine ring assembly 2 further comprises upstream pins 40 and downstream pins 50. The upstream pins 40 pass through the second upstream flange 22 of the upstream radial clamp 62 as well as the upstream lug 16 of a ring sector 10. The downstream pins 50 pass at least partially through the downstream radial clamp 64, and more particularly the radially protruding attachment portion 640, as well as the downstream hooking lug 14.

FIG. 2 represents a zoom of FIG. 1 on the downstream pin 50.

As appearing in FIGS. 1 and 2, the downstream pin 50 passes through a passage 140 of the downstream hooking lug 14 of the ring sector 10. The passage 140 extends axially between an upstream end 144 and a downstream end 146 and is delimited radially by an inner surface 142 against which the pin is bearing and which extends over an axial length L1.

Each downstream pin 50 comprises an inner end 502 and an outer end 504. The inner end 502 is inside the ring 4, between the downstream hooking lug 14 and the upstream hooking lug 16, and the outer end 504 is outside the ring 4, inserted into a radial clamp of the ring support structure 6. The outer end 504 comprises a first chamfer **504*a* allowing its insertion into a housing 642 provided in the attachment portion 640 of the downstream radial clamp 64**.

The inner end 502 comprises a second rounded chamfer **502*a* extending from the inner end 502 to a bearing surface 506 extending parallel to the axial direction $D_x$. The junction between the second chamfer 502*a* and the bearing surface 506 of the downstream pin 50 is disposed in the passage 140 of the downstream hooking lug 14, facing the inner surface 142 of the passage 140**.

Thus, the bearing surface 506 of the downstream pin 50 which is bearing against the inner surface 142 of the passage 140 of the downstream hooking lug 14 comprises an axial length L2 smaller than the axial length L1 of the inner surface 142 of the passage 140.

FIG. 3 illustrates a downstream pin 50 according to a second embodiment.

The downstream pin 50 of the second embodiment differs from the first embodiment of FIGS. 1 and 2 in several points.

First, the second chamfer **502*a* does not extend into the passage 140. The downstream pin 50 however comprises a groove 508 made over the entire periphery of the pin and disposed facing the downstream end 146 of the passage 140**.

This groove 508 thus ensures that the axial length L2 of the bearing surface 506 of the pin 50 is smaller than the axial length L1 of the inner surface 142 of the passage 140.

FIG. 4 illustrates a downstream pin 50 according to a third embodiment.

The downstream pin 50 of the third embodiment differs from the second embodiment in FIG. 3 in that the groove 508 comprises a trapezoid-shaped profile in a cutting plane comprising the axial direction $D_A$ and the radial direction $D_R$, whereas in FIG. 3 the groove 508 comprises a rectangular profile in the same cutting plane.

The radially inner side of the trapezoid of the groove 508 is smaller than the radially outer side of the groove, thus further reducing the length of the bearing surface 506 of the downstream pin 50.

In this third embodiment, the pin 50 comprises axial symmetry along an axis parallel to the axial direction $D_A$, a first radius R1 in a cutting plane perpendicular to the axial direction $D_A$ and intersecting the bearing surface 506 of the pin 50, a second radius in a cutting plane perpendicular to the axial direction $D_A$ and intersecting the groove 508, and a third radius in a cutting plane perpendicular to the axial direction $D_A$ and intersecting the inner axial end 502 of the pin 50, the first radius R1 being larger than the second radius R2, which is itself larger than the third radius R3.

FIG. 5 illustrates a downstream pin 50 according to a fourth embodiment.

The downstream pin 50 of the fourth embodiment differs from the second embodiment of FIG. 3 in that the chamfer **502*a* is still a little smaller, but especially in that it comprises a second groove 509 made over the entire periphery of the pin and disposed facing the upstream end 144 of the passage 140**.

The downstream pin of FIG. 5 is presented in a configuration where the pin passes not only through the hooking portion 640 of the downstream radial clamp 64 and the hooking lug 14 of the ring 4 but also through an additional clamp 680 which could be an additional radial clamp of the ring support structure 6.

FIG. 6 illustrates a downstream pin 50 according to a fifth embodiment.

The downstream pin 50 of the fifth embodiment differs from the fourth embodiment illustrated in FIG. 5 in that the grooves 508 and 509 comprise a semicircular-shaped profile in a cutting plane comprising the axial direction $D_A$ and the radial direction $D_R$, whereas in FIG. 5 the grooves 508 and 509 comprise a rectangular profile in the same cutting plane.

FIG. 7 illustrates a downstream pin 50 according to a sixth embodiment

The downstream pin 50 of the sixth embodiment differs from the second embodiment of FIG. 3 in that the inner end 502 is smaller along the radial direction $D_R$ than the outer end 504, and in that the inner end 502 does not comprise a chamfer, but instead, a ramp **502*c* between the inner end 502 and the bearing surface 506** of the pin.

The downstream pin 50 of the sixth embodiment illustrated in FIG. 7 further comprises a hollowed-out portion 510 located between the bearing surface 506 of the downstream pin 50 and the downstream end 504. The hollowed-out portion 510 thus forms a second ramp between the bearing surface 506 of the pin 50, the bearing surface 506 is thus at a distance from the upstream end 144 and the downstream end 146 of the passage 140.

In another embodiment of the invention, the upstream pins 40 may have the same conformation as the downstream pins 50.

The present invention thus proposes a turbine ring assembly for reducing the risk of wear of the wings of the hooking lugs of the ring receiving the pins, in particular at the edges of the bores of the wings.

The invention claimed is:

1. A turbine ring assembly comprising a plurality of ring sectors made of ceramic matrix composite material forming a turbine ring, defining an axial direction and a radial direction, and a ring support structure held by a turbine casing, each ring sector comprising a base from which an upstream hooking lug and a downstream hooking lug axially spaced from each other extend radially outwards, the ring support structure including an upstream radial clamp and a downstream radial clamp between which the upstream hooking lug and the downstream hooking lug of each ring sector are held, and the ring assembly comprising, for each ring sector, at least one pin and at least one passage passing axially through a downstream or upstream hooking lug over an axial length of the passage, said at least one pin cooperating with said at least one passage and one of the upstream or downstream radial clamps of the ring support structure, wherein the passage extends axially between an upstream end and a downstream end and is delimited by a planar inner surface extending over the axial length of the passage and, along a cutting plane including the axial direction, said at least one pin comprises a peripheral surface which has a planar bearing portion facing the inner surface of said passage through which the pin passes, said bearing portion of the peripheral surface of the pin facing the inner surface of the passage through which the pin extending axially over an axial length smaller than said axial length of the passage passes.

2. The turbine ring assembly according to claim 1, wherein the bearing portion of the peripheral surface of the pin comprises an axial length comprised between 50% and 90% of the axial length of the passage.

3. The turbine ring assembly according to claim 1, wherein said at least one pin comprises two opposite axial ends, the pin comprising a chamfer, preferably frustoconical chamfer, on at least one axial end of the pin.

4. The turbine ring assembly according to claim 3, wherein a chamfer extends between an axial end of the pin and said bearing portion of the peripheral surface of the pin, a portion of the chamfer being disposed facing the inner surface of the passage through which the pin passes.

5. The turbine ring assembly according to claim 1, wherein said at least one pin comprises at least one groove extending over the perimeter of the peripheral surface of the pin in a plane orthogonal to the axial direction, the groove(s) comprising a thickness along the axial direction and being positioned facing one end of said passage through which the pin passes.

6. The turbine ring assembly according to claim 5, wherein the groove comprises a semicircular shape in a cutting plane comprising the axial direction and the radial direction.

7. The turbine ring assembly according to claim 5, wherein the groove comprises a trapezoidal shape in a cutting plane comprising the axial direction and the radial direction.

8. The turbine ring assembly according to claim 5, wherein the pin comprises axial symmetry along an axis parallel to the axial direction, a first radius in a cutting plane perpendicular to the axial direction and intersecting the bearing portion of the peripheral surface of the pin, a second radius in a cutting plane perpendicular to the axial direction and intersecting the groove, and a third radius in a cutting plane perpendicular to the axial direction and intersecting the axial end of the pin disposed facing the ring, the first radius being larger than the second radius, which is itself greater than the third radius.

9. The turbine ring assembly according to claim 1, comprising, for each ring sector, at least one downstream pin cooperating with the downstream hooking lug and the downstream radial clamp of the support structure, and at least one upstream pin cooperating with the upstream hooking lug and the upstream radial clamp.

10. The turbine ring assembly according to any claim 1, comprising, for each ring sector, at least two pins, each pin passing transversely through the upstream hooking lug and the downstream hooking lug of the ring sector and the ring support to keep the ring sector and the ring support secured to each other.

11. A turbomachine comprising an assembly according to claim 1.

* * * * *